United States Patent Office 3,451,939
Patented June 24, 1969

3,451,939
THRESHOLD COMPOSITIONS AND METHODS
Paul H. Ralston, Bethel Park, Pa., assignor to Calgon Corporation, a corporation of Delaware
No Drawing. Filed Apr. 13, 1966, Ser. No. 542,190
Int. Cl. C02b 5/00
U.S. Cl. 252—181                                8 Claims

ABSTRACT OF THE DISCLOSURE

This invention relates to synergistic compositions and the use thereof for inhibiting the formation of scale in water systems. In particular, it relates to certain combinations of polyphosphates and methylene phosphonates.

---

Most commercial water contains alkaline earth metal cations, such as calcium, barium, magnesium, etc., and several anions such as bicarbonate, carbonate, sulfate, oxalate, phosphate, silicate, fluoride, etc. When combinations of these anions and cations are present in concentrations which exceed the solubility of their reaction products, precipitates form until these product solubility concentrations are no longer exceeded. For example, when the concentrations of calcium ion and carbonate ion exceed the solubility of the calcium carbonate reaction product, a solid phase of calcium carbonate will form.

Solubility product concentrations are exceeded for various reasons, such as evaporation of the water phase, change in pH, pressure or temperature, and the introduction of additional ions which form insoluble compounds with the ions already present in the solution.

As these reaction products precipitate on the surface of the water carrying system, they form scale. The scale prevents effective heat transfer, interferes with fluid flow, facilitates corrosive processes, and harbors bacteria. This scale is an expensive problem in many industrial water systems, causing delays and shutdowns for cleaning and removal.

Scale-forming compounds can be prevented from precipitating by inactivating their cations with chelating or sequestering agents, so that the solubility of their reaction products is not exceeded. Generally, this requires many times as much chelating or sequestering agent as cation, and these amounts are not always desirable or economical.

More than twenty-five years ago it was discovered that certain inorganic polyphosphates would prevent such precipitation when added in amounts far less than the concentrations needed for sequestering or chelating. See, for example, Hatch and Rice, "Industrial Engineering Chemistry," vol. 31, page 51 at 53; Reitemeier and Buehrer, "Journal of Physical Chemistry," vol. 44, No. 5, page 535 at 536 (May 1940); Fink and Richardson U.S. Patent 2,358,222; and Hatch U.S. Patent 2,539,305. When a precipitation inhibitor is present in a potentially scale-forming system at a markedly lower concentration than that required for sequestering the scale-forming cation, it is said to be present in "threshold" amounts. Generally, sequestering takes place at a weight ratio of threshold active compound to scale-forming cation component of greater than about ten to one, and threshold inhibition generally takes place at a weight ratio of threshold active compound to scale-forming cation component of less than about 0.5 to 1.0. Where the scale-forming compound is an alkaline earth metal product, I have found that the threshold active compositions of my invention will inhibit their precipitation from solution when added to the solution in threshold amounts of up to about 100 parts by weight per million parts water (although I prefer up to about 25 p.p.m. for most commercial purposes).

The "threshold" concentration range can be demonstrated in the following manner. When a typical scale-forming solution containing the cation of a relatively insoluble compound is added to a solution containing the anion of the relatively insoluble compound and a very small amount of a threshold active inhibitor, the relatively insoluble compound will not precipitate even when its normal equilibrium concentration has been exceeded. If more of the threshold active composition is added, a concentration is reached where turbidity or a precipitate of uncertain composition results. As still more of the threshold active composition is added, the solution again becomes clear. This is due to the fact that threshold active compositions in high concentrations also act as sequestering agents. Thus, there is an intermediate zone between the high concentrations at which threshold active compositions sequester the cations of relatively insoluble compounds and the low concentrations at which they act as threshold inhibitors. Therefore, one could also define "threshold" concentrations as all concentrations of threshold active compositions below that concentration at which this turbid zone or precipitate is formed.

The polyphosphates are generally effective threshold inhibitors for many scale-forming compounds at temperatures below 100° F. But after prolonged periods at higher temperatures, they lose some of their effectiveness. Moreover, in an acid solution, they revert to ineffective or less effective compounds.

I have discovered that certain combinations of water soluble polyphosphates and methylene phosphonates perform in the threshold range far better than would be expected from the performance of either class of compounds alone.

By polyphosphates I mean the water-soluble glassy and crystalline phosphates having ratios of alkali metal oxide and/or alkaline earth metal oxide to $P_2O_5$ of from about 1:1 to about 2:1. By methylene phosphonates I mean to include broadly any compound containing as an active group the methylene phosphonic acid group and/or a salt thereof. Included in the methylene phosphonates are the amino methylene phosphonates, specifically amino tris methylene phosphonic acid and its water-soluble salts, ethylene diamine tetra methylene phosphonic acid and its water-soluble salts, and hexamethylene diamine tetra methylene phosphonic acid and its water-soluble salts. The preferred methylene phosphonates are those of the series $R'N(R)_2$ where R is

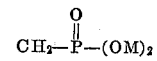

and R' is R or $(CH_2)nN(R)_2$, n is a whole number from two to six, and M is hydrogen or a cation which forms a soluble methylene phosphonate salt.

The preferred combinations of polyphosphates and methylene phosphonates are in the range of about 1:1 to about 10:1 by weight. The preferred ratio of polyphosphate to amino methylenephosphonates is about 4:1 to about 6:1.

I have performed numerous experiments at room temperatures and at elevated temperatures to demonstrate the effectiveness of different concentrations and such combinations of polyphosphates and methylenephosphonates and salts thereof in inhibiting the precipitation of various scale-forming salts. In these experiments, I mixed solutions of two soluble salts in the presence of the inhibitor composition to form a solution containing a relatively insoluble salt at several times its equilibrium concentration. As a control, each experiment was also conducted in the absence of a precipitation inhibitor.

By titrating a small amount of the solution and thereby determining the concentration of one of its soluble components, the amount of precipitate formed in a particular test solution at a particular time was calculated. I used the well-known Schwarzenbach titration and determined the concentration of the alkaline earth metal cation. At the end of the experiment, the concentration of soluble cation in each control solution, as determined by titration, was considered to be 0% inhibition. If no precipitate formed in an inhibited test solution and it therefore contained all of its original cation content, it was considered to be 100% inhibited. Titration results intermediate to the 0% and 100% inhibition values were directly related to these extremes and converted to percent inhibition.

For example, in the case of the scale-forming salt, calcium carbonate ($CaCO_3$), I added, with agitation, 5 ml. of 0.1 M $CaCl_2$ to a solution containing 490 ml. distilled water and 5 ml. 0.1 M $Na_2CO_3$. In the control experiment no inhibitor was present in the test solution. In other experiments, various amounts of a scale inhibitor were present prior to the addition of the calcium chloride. At the end of the storage period, the control solution contained both soluble calcium and calcium precipitated as calcium carbonate. Titration of the soluble calcium in the control solution by the familiar Schwarzenbach method indicated the concentration of calcium carbonate in solution. This calcium carbonate concentration was the equilibrium concentration under the conditions of the test (pH, temperature, ionic strength, etc.).

When a few parts per million of my scale inhibitor were present in the test described above, more calcium ion (and therefore more carbonate ion) remained in solution and less calcium carbonate precipitated at the end of the storage test. This greater concentration was confirmed by the titration of calcium in the solutions and related to the equilibrium concentration of the untreated control solution. In the tables, "No. Times Equilibrium Concentration" represents the relative magnitude of the soluble scale-forming salt concentration in the presence of an inhibitor to the scale-forming salt concentration in the absence of an inhibitor at the temperature of the test. Thus, 3.6 times the equilibrium concentration of $CaCO_3$ at 150° F. means that the concentration of $CaCO_3$ in the inhibited solution was 3.6 times the equilibrium concentration of the control solution at 150° F.

Table I illustrates the results of my invention in the inhibition of calcium sulfate scale formation. In the table, Phosphonate A is the pentasodium salt of amino tris (methylene phosphonic acid)

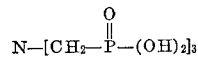

Phosphonate B is the acid form of ethylene diamine tetra (methylenephosphonic acid):

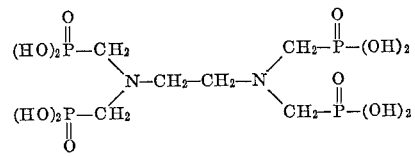

"Calgon" is a polyphosphate glass having a ratio of $Na_2O$ to $P_2O_5$ of 1.1 to 1. Phosphonate C is the acid form of hexamethylene diamine tetra (methylenephosphonic acid): $R_2$—N—$(CH_2)_6$—N—$R_2$ where R is the methylenephosphonic acid group.

Phosphonate D is the calcium salt of amino tris (methylene phosphonic acid)

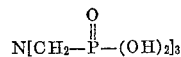

The tests were performed at 130° F. with 2.3 times the equilibrium concentration of calcium sulfate with no inhibitor present. Measurements were made after 24 hours using the test procedure previously described.

TABLE I

| Inhibitor | Conc. (p.p.m.) | Percent inhibition |
|---|---|---|
| "Calgon" | 5 | 0 |
| Phosphonate A | 1.25 | 24.0 |
| "Calgon" | 5 } | 93.0 |
| Phosphonate A | 1.25 } | |
| Pentasodium tripolyphosphate | 4 | 7 |
| Phosphonate B | 1 | 29 |
| Pentasodium tripolyphosphate | 4 } | 100 |
| Phosphonate B | 1 } | |
| Tetrasodium pyrophosphate | 5 | 0 |
| Phosphonate C | 0.5 | 7 |
| Tetrasodium pyrophosphate | 5 } | 52 |
| Phosphonate C | 0.5 } | |
| "Calgon" | 3 | 0 |
| Phosphonate D | 2 | 21 |
| "Calgon" | 3 } | 35 |
| Phosphonate D | 2 } | |

Table II shows the results of similar tests carried out with solutions of calcium carbonate at 3.6 times the equilibrium concentration of calcium carbonate when no inhibitor was present. The temperature was held at 150° F. and the results were noted after twenty-four hours.

TABLE II

| Inhibitor | Conc. (p.p.m.) | Percent inhibition |
|---|---|---|
| "Calgon" | 0.1 | 35 |
| Phosphonate B | 0.1 | 48 |
| "Calgon" | 0.05 } | 76 |
| Phosphonate B | 0.05 } | |

Table III shows the results of similar tests performed with solutions of barium sulfate at 12 times the equilibrium concentration of barium sulfate with no inhibitor present. The results of the test were noted after 24 hours at 75° F.

TABLE III

| Inhibitor | Conc. (p.p.m.) | Percent inhibition |
|---|---|---|
| "Calgon" | 2 | 18 |
| Phosphonate C | 2 | 14 |
| "Calgon" | 1 } | 27 |
| Phosphonate C | 1 } | |
| "Calgon" | 2 | 18 |
| Phosphonate D | 2 | 9 |
| "Calgon" | 1 } | 23 |
| Phosphonate D | 1 } | |

My invention contemplates the use of compositions containing methylene phosphonate compounds and polyphosphates in ratios of about 1:1 to about 1:10, in concentrations throughout the threshold range. Up to about 100 parts by weight of my composition per million parts water may be used; in most cases more than 100 p.p.m. will be wasteful. A preferred range is about 0.5 p.p.m. to about 25 p.p.m.

I do not intend to be limited to the examples and specific illustrations herein. My invention may be otherwise practiced within the scope of the following claims.

I claim:

1. Composition useful for inhibiting the deposition of alkaline earth metal scale from water containing scale-forming constituents consisting essentially of (a) about one part by weight of a water-soluble compound selected from the group consisting of

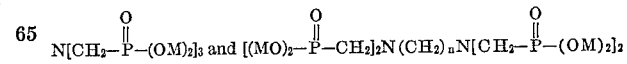

where each M is independently selected from the group H, $NH_4$ and alkali metal, and $n$ is a whole number from 2 to 6, and (b) about one to about ten parts by weight of a water-soluble polyphosphate having a molar ratio of alkali and alkaline earth metal oxide to $P_2O_5$ of from about 1:1 to about 2:1.

2. Method of inhibiting the deposition of scale-forming salts from water comprising maintaining in said water (a) at least about 0.05 part by weight of a water-soluble compound selected from the group consisting of

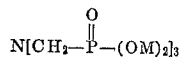

and

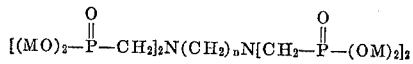

where each M is independently selected from the group H, NH$_4$ and alkali metal, and $n$ is a whole number from 2 to 6, and (b) at least about 0.05 part by weight of a water-soluble polyphosphate having a molar ratio of alkali and alkaline earth metal oxide to P$_2$O$_5$ of from about 1:1 to about 2:1 per million parts water.

3. Composition of claim 1 in which the compound containing the methylene phosphonate group is an amino tris (methylene phosphonate) salt.

4. Composition of claim 1 in which the compound containing the methylene phosphonate group has the formula

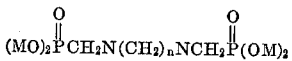

where each M is independently selected from hydrogen, ammonium, anl alkali metal and $n$ is a whole number from 2 to 6.

5. Method of claim 2 in which the compound containing the methylene phosphonate group is sodium amino tris (methylene phosphonate).

6. Method of claim 2 in which the ratio of (a) to (b) is no greater than 1:1.

7. Method of inhibiting deposition of insoluble scale from water from about 0.5 parts per million containing scale-forming salts consisting essentially of adding to said water up to about 100 parts per million of a threshold composition comprising (a) about one part by weight of a water-soluble compound containing at least one methylene phosphonate group, and (b) about one to about ten parts by weight of a water-soluble polyphosphate having a molar ratio of alkali and alkaline earth metal oxide to P$_2$O$_5$ of from about 1:1 to about 2:1.

8. Method of claim 2 in which the weight ratio of (b) to (a) is from about 4:1 to about 6:1.

References Cited

UNITED STATES PATENTS

| 2,575,177 | 11/1951 | Lefforge | 252—181 |
| 2,599,807 | 6/1952 | Bersworth | 260—500 |
| 3,099,521 | 7/1963 | Arensberg | 252—181 |
| 3,135,670 | 6/1964 | Ristaino et al. | 252—181 |
| 3,288,846 | 11/1966 | Irani et al. | 260—500 |

FOREIGN PATENTS 667,506   3/1952   Great Britain.

LEON D. ROSDOL, *Primary Examiner.*

W. SCHULZ, *Assistant Examiner.*

U.S. Cl. X.R.

210—58; 252—87, 137; 260—500

UNITED STATES PATENT OFFICE
CERTIFICATE OF CORRECTION

Patent No. 3,451,939                                    June 24, 1969

Paul H. Ralston

It is certified that error appears in the above identified patent and that said Letters Patent are hereby corrected as shown below:

Column 6, line 2, beginning with "from about 0.5" cancel all to and including "comprising" in line 5, and insert -- containing scale-forming salts comprising adding to said water from about 0.5 parts per million up to about 100 parts per million of a threshold composition consisting essentially of --.

Signed and sealed this 21st day of April 1970.

(SEAL)
Attest:

Edward M. Fletcher, Jr.                                WILLIAM E. SCHUYLER, JR.
Attesting Officer                                           Commissioner of Patents